No. 758,627. PATENTED MAY 3, 1904.
T. F. DOWNING.
HOSE COUPLING.
APPLICATION FILED JAN. 16, 1904.
NO MODEL. 2 SHEETS—SHEET 1.
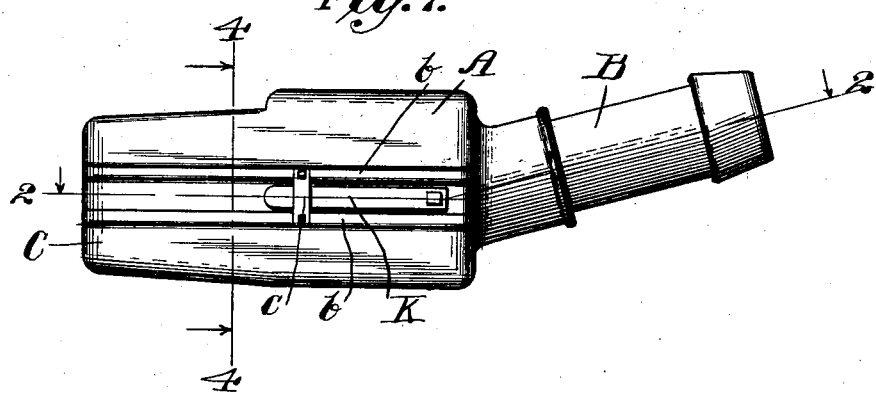
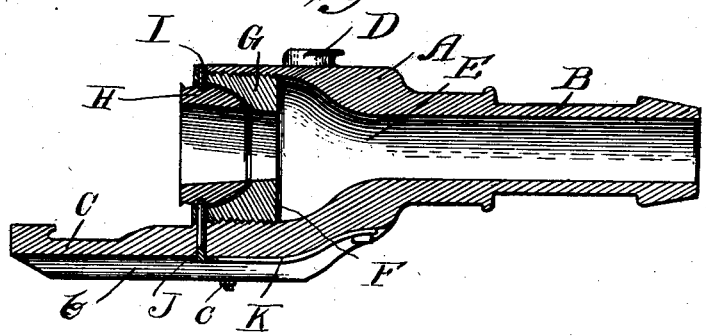
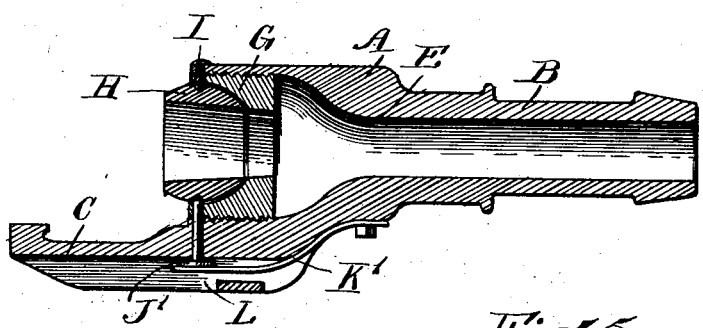
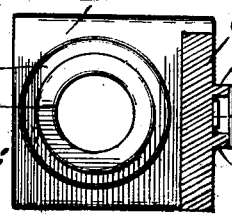
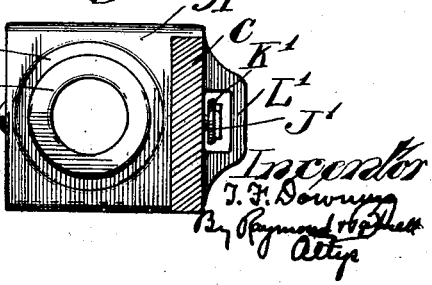

No. 758,627. PATENTED MAY 3, 1904.
T. F. DOWNING.
HOSE COUPLING.
APPLICATION FILED JAN. 16, 1904.
NO MODEL. 2 SHEETS—SHEET 2.
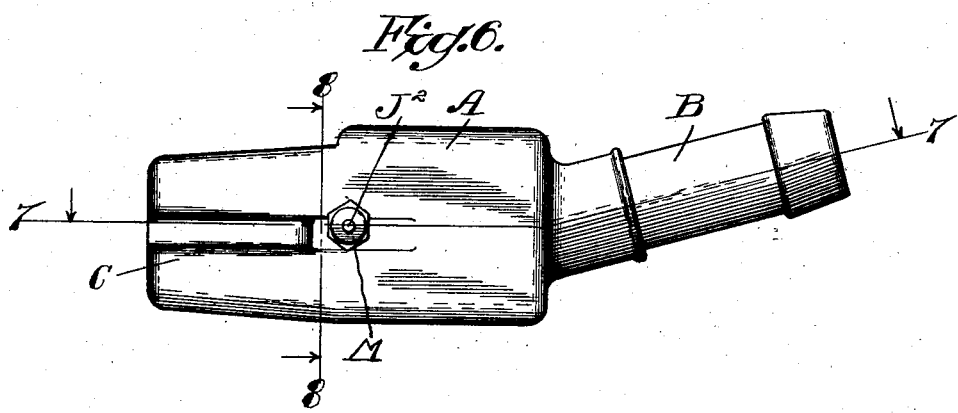
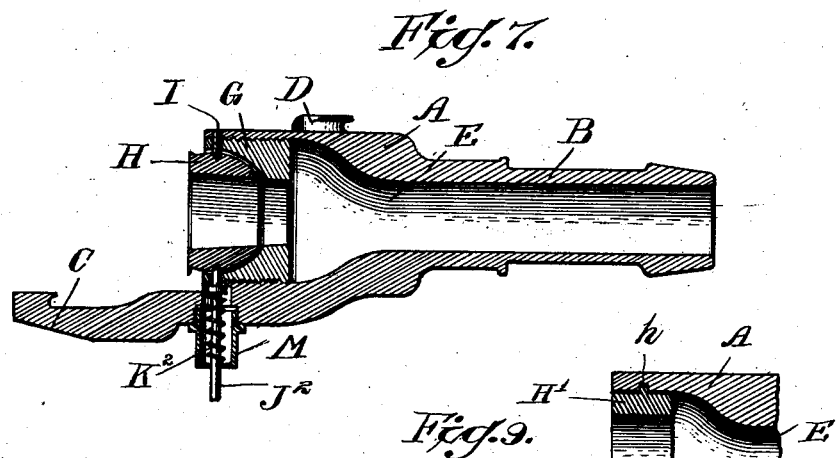
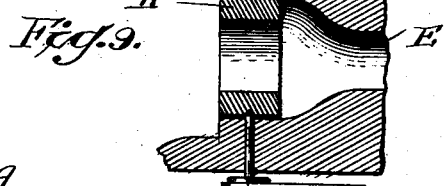
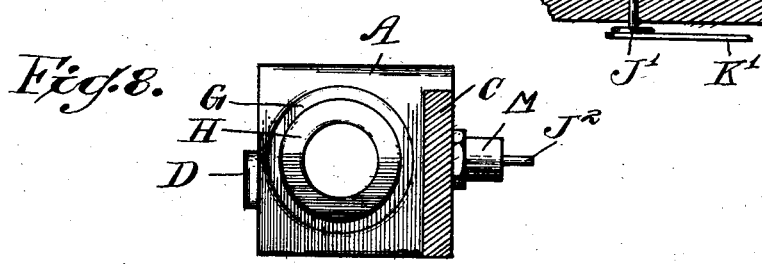
Witnesses:
Inventor:
Thomas F. Downing
By Raymond & Bennett
His Attorneys No. 758,627.

Patented May 3, 1904.

UNITED STATES PATENT OFFICE.

THOMAS F. DOWNING, OF CHICAGO, ILLINOIS.

HOSE-COUPLING.

SPECIFICATION forming part of Letters Patent No. 758,627, dated May 3, 1904.

Application filed January 16, 1904. Serial No. 189,305. (No model.)

*To all whom it may concern:*

Be it known that I, THOMAS F. DOWNING, a citizen of the United States, residing at Chicago, in the county of Cook and State of Illinois, have invented certain new and useful Improvements in Hose-Couplings, of which the following is a specification.

My invention relates to improvements in hose-couplings, especially couplings intended and adapted for use in coupling train-pipe hose between cars for conveying steam through a railway-train. It is a recognized fact in this art that in order to preserve a tight joint between cars and to adjust itself to the differences and irregularities in motion between the adjoining ends of cars, as well, also, as to provide an element of flexibility which shall compensate for any inaccuracy in the fit between coupler-heads, that the coupler-heads should be provided with what is commonly termed a "rocking" gasket, by which is meant a gasket which is seated in a seat of spherical section in such a manner that the correspondingly-shaped gasket may rock within such seat.

The object of my invention is to provide a coupler-head with a rocking gasket which may be readily inserted and removed, which shall be seated in such a manner as to offer no obstruction to the steam-passage through the coupler-head, and which shall be seated in an inexpensive and yet substantial and durable manner. These and such other objects as may hereinafter appear are attained by the devices shown in the accompanying drawings, in which—

Figure 1 is a side elevation of a coupler-head provided with one form of my invention. Fig. 2 is a horizontal longitudinal section on the line 2 2 of Fig. 1 looking in the direction indicated by the arrows. Fig. 3 is a horizontal section of a modified form of my device. Fig. 4 is an end view of the coupler shown in Figs. 1 and 2, showing the coupler-arm in section. Fig. 5 is an end view of the coupler shown in Fig. 3, showing the coupler-arm in section. Fig. 6 is a side elevation of another modification of my invention. Fig. 7 is a longitudinal section on the line 7 7 of Fig. 6 looking in the direction indicated by the arrows. Fig. 8 is a view on the line 8 8 of Fig. 6 looking in the direction indicated by the arrows, and Fig. 9 is a detail of a modification.

Like letters of reference indicate similar parts in the several figures of the drawings.

A is the body of a coupler, provided with a neck B, adapted to be connected with the usual section of flexible hose leading to the train-pipe.

C is the coupling-arm, adapted to interlock with the undercut lug D on the opposite coupler.

The coupler-head A and neck B are provided with a steam-passage E extending therethrough. As usually constructed the coupler-head is provided also with a brass bushing F, which is provided adjacent to its outer end with the gasket-seat. This gasket-seat is spherical or, more properly, is concaved to fit a section of a sphere.

Within the gasket-seat so provided is seated the gasket H, which is convexed externally in the form of a section of a sphere and is pivotally secured in place by two pins or supports which project above the face of the gasket-seat. These pins are preferably mounted so as to project laterally, one of the pins, I, being most conveniently in the form of a permanently-mounted stud, the other pin, J, being movably mounted and preferably held in place by spring-pressure—as, for instance, by the spring-arm K, of which it constitutes an extension.

The spring-arm K is protected by ribs $b\ b$, which extend longitudinally of the coupler-head and which also serve to reinforce the coupler-head at a needed point. The spring-arm is further confined between the ribs $b\ b$ by a bridge $c$, which extends across and is secured to the ribs $b\ b$, as shown in Figs. 1 and 4.

In the constructions shown in Figs. 1 and 2 preferably the gasket H is provided with recesses for receiving the projecting ends of the pins I J, although this is not essential, because in seating the gasket the pins I J can be forced into the material which is commonly used for such gaskets. This material is usually what is called "Jenkins' composition," which expands and becomes somewhat plastic under a high temperature.

With the gasket provided with suitable recesses for receiving the pins I J and with the projecting end of the pin J formed with a beveled or rounded surface the gasket H is readily seated by fitting the pin I in the recess provided for it and swinging the gasket back upon the center or hinge so provided and into its seat, whereupon as the rounded surface of the gasket comes in contact with the projecting end of the pin J the pin J will be raised against pressure of the spring-arm K until the pin J comes opposite the recess provided for it, whereupon it will be forced by the tension of the spring into said recess and the gasket will be securely clamped in position. It will thus be seen that the gasket is firmly and pivotally secured at two opposite points upon its periphery.

With the preferred construction the gasket and its seat are exactly on the lines of a section of a sphere, and the pins I J are located diametrically opposite each other. With the gasket so mounted it will be seen that it will freely lock within its seat upon the pivotal supports I J, will readily adapt itself to any vertical motion of the cars, and in the coupling of the complementary parts of the coupler it will adapt itself to any inexactness in fit between the couplers.

To remove the gasket, it is only necessary to retract the pin J against the pressure of the spring-arm K, whereupon the gasket may be freely withdrawn.

In the modification of my invention shown in Figs. 3 and 5 I have substituted a separate spring-arm K' for the spring-arm K and a separate button-headed pin J' in place of the pin J, which in Fig. 2 is shown as being integral with the spring-arm K. In this modified form I have also shown the stop L' cast on the coupler-head to limit the outward movement of the spring-arm K'.

In the modification shown in Figs. 6, 7, and 8 in place of the pin J, I use a spring-pressed pin J², which is held in place by a helical spring K², which surrounds the pin J² and abuts against a collar adjacent to the inner end thereof, said spring being held in position by a sleeve M, which is in the form of a hollow stud threaded into the coupler-head.

Obviously these modifications are merely suggestive of various ways of embodying my invention, which consists, primarily, in supporting a rocking gasket within a suitable seat in a coupler-head by means of pivotal pins mounted in the coupler-head and projecting into the periphery of the gasket, at least one of said pins being removable. It is clear, therefore, that various changes in detail may be made without departing from the spirit of my invention.

In Fig. 9 the bushing G is omitted, the gasket-seat and gasket are cylindrical, and the gasket H' is provided at one side with an integral projection h, which engages a corresponding recess in the coupler-head A, the opposite side of the gasket being held by a spring-pressed pin J', as in Fig. 3.

It will thus be seen that my invention is not necessarily limited to the use of a composition gasket, nor to the use of a concave gasket-seat or a convex-surfaced gasket, that a separate bushing for the gasket-seat is not essential, and that the coengaging recesses and projections upon the coupler-head and the gasket may be arranged in various ways without departing from the spirit of my invention.

I claim—

1. The combination with a coupler-head provided with a gasket-seat, of a gasket adapted to and arranged to rock upon said seat, and means for movably securing said gasket to its seat, said means comprising a projection extending from the coupler-head into said gasket, said projection being movable in a direction to disengage said gasket.

2. The combination with a coupler-head provided with a gasket-seat, of a gasket adapted to said seat, means for securing said gasket to its seat, said means comprising a pair of projections extending from the coupler-head into the gasket, one of said projections being movable in a direction to disengage said gasket, and means for yieldingly holding said movable projection in contact with said gasket.

3. The combination with a coupler-head provided with a gasket-seat, of a gasket adapted to said seat, and means for movably retaining the gasket in said seat, said means comprising a pair of pins mounted diametrically opposite to each other and extending into said gasket, and a spring arranged to hold one of said pins in movable contact with said gasket.

4. The combination with a coupler-head provided with a substantially hemispherical gasket-seat, of a gasket comprising substantially a section of a sphere, means for securing said gasket to its seat, said means comprising a pair of pins projecting from the coupler-head and adapted to engage the gasket at points upon diametrically opposite sides of the sphere from which the gasket is produced, one of said pins being movable in a direction to disengage said gasket, and means for holding said movable pin in engagement with said gasket, all so arranged that said gasket may rock within its seat.

5. The combination with a coupler-head provided with a concave seat adapted to substantially fit a section of a sphere, of a gasket formed substantially of a section of a sphere and adapted to said seat, means for securing said gasket to said seat, said means comprising a pair of pins projecting from said seat at points on diametrically opposite sides thereof and adapted to pivotally engage said gasket at points on diametrically opposite sides thereof, at least one of said pins being movable in a direction to disengage said gasket, and means for yieldingly holding said movable pin in operative engagement with such gasket.

6. The combination with a coupler-head provided with a gasket-seat, of means for securing a gasket to said seat, said means comprising a projection extending inwardly from said coupler-head in a position to engage a gasket when seated upon said gasket-seat, and an oppositely-disposed, yieldingly-mounted, projection also extending inwardly from said coupler-head in a position to engage said gasket when seated upon said gasket-seat.

7. The combination with a coupler-head provided with a gasket-seat, of a gasket adapted to said seat and provided with a convex surface, means for holding said gasket in its seat, said means comprising a projection extending inwardly from the coupler-head at points adapted to engage said gasket when seated, a second projection extending in like manner from the gasket-seat and provided with a rounded or tapered surface adapted to engage the convex surface of the gasket, and means for yieldingly holding said second projection in locking engagement with the gasket.

8. In a device of the class described, the combination with a coupler-head provided with a gasket-seat and provided with parallel ribs upon one face thereof, of a spring-arm mounted between said ribs and secured at one end to said coupler-head, and a gasket-locking pin extending through the coupler-head, said gasket-locking pin being yieldingly held in locking position by the free end of the spring-arm.

THOMAS F. DOWNING.

Witnesses:
OTTO R. BARNETT,
G. Y. DANKWARD.